July 10, 1956     T. H. SLOAN     2,753,589
APPARATUS FOR EVISCERATING SHRIMP
Filed April 27, 1953     7 Sheets-Sheet 1
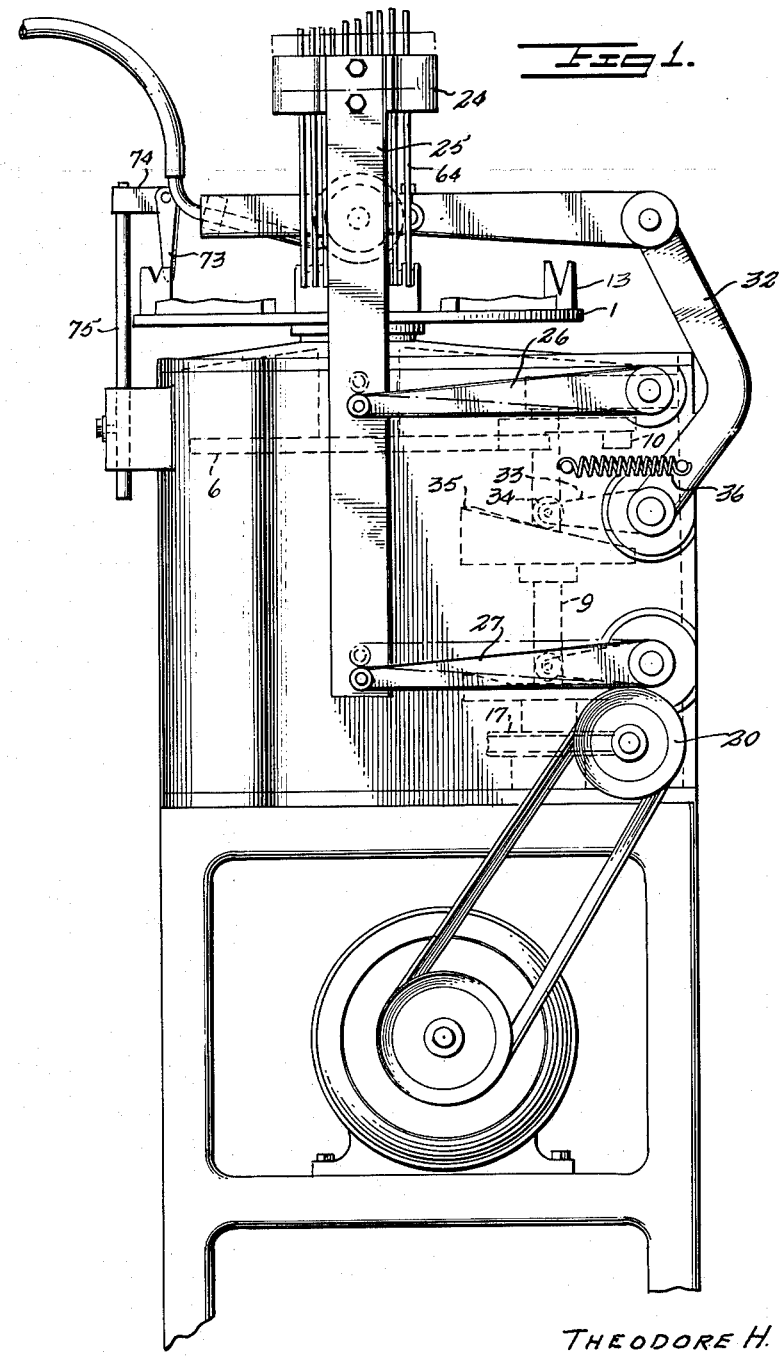
INVENTOR
THEODORE H. SLOAN,
BY Almon S. Nelson
ATTORNEY

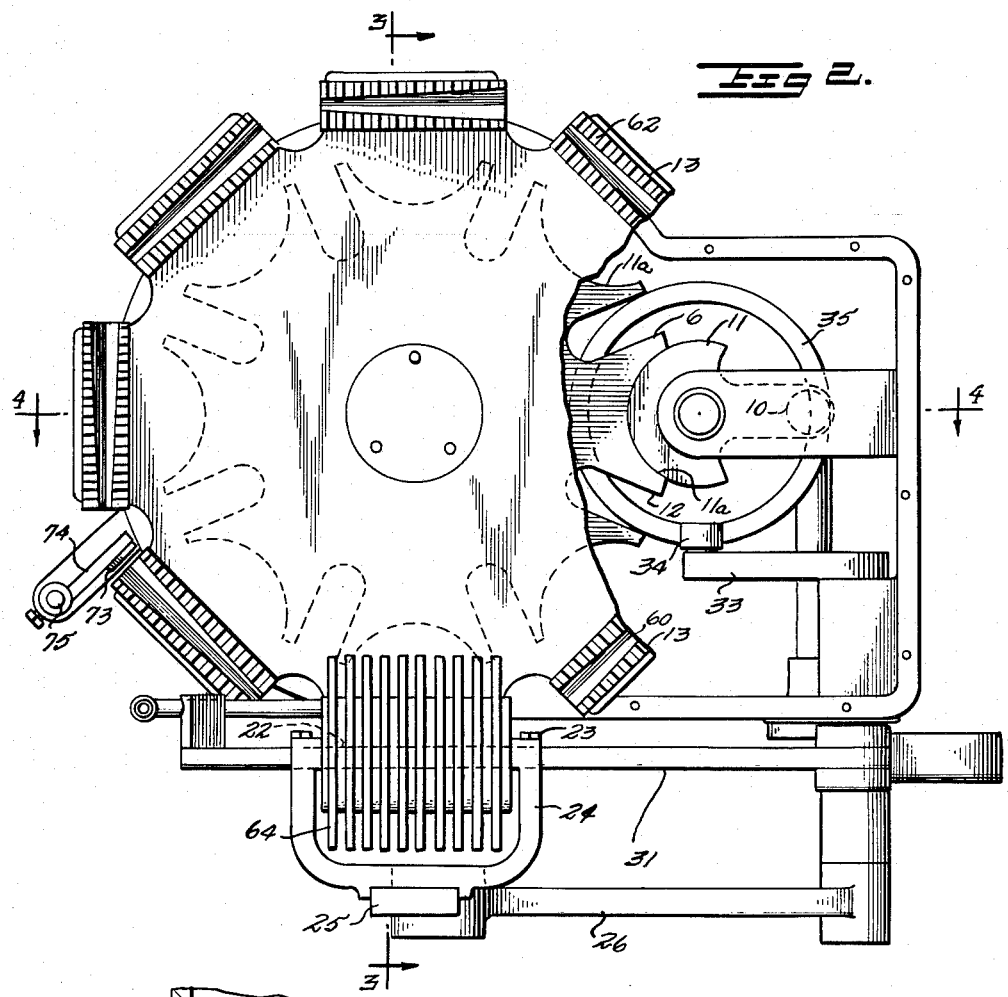
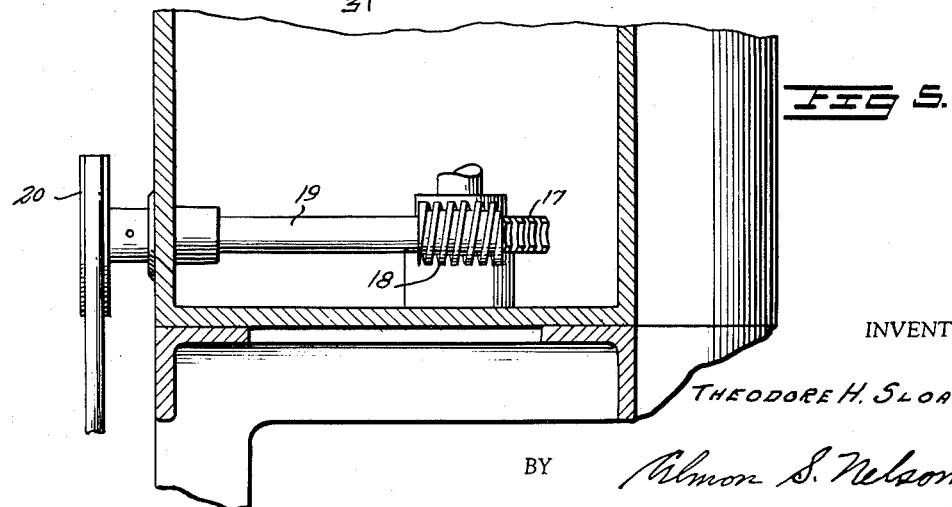

July 10, 1956  T. H. SLOAN  2,753,589
APPARATUS FOR EVISCERATING SHRIMP
Filed April 27, 1953  7 Sheets-Sheet 3
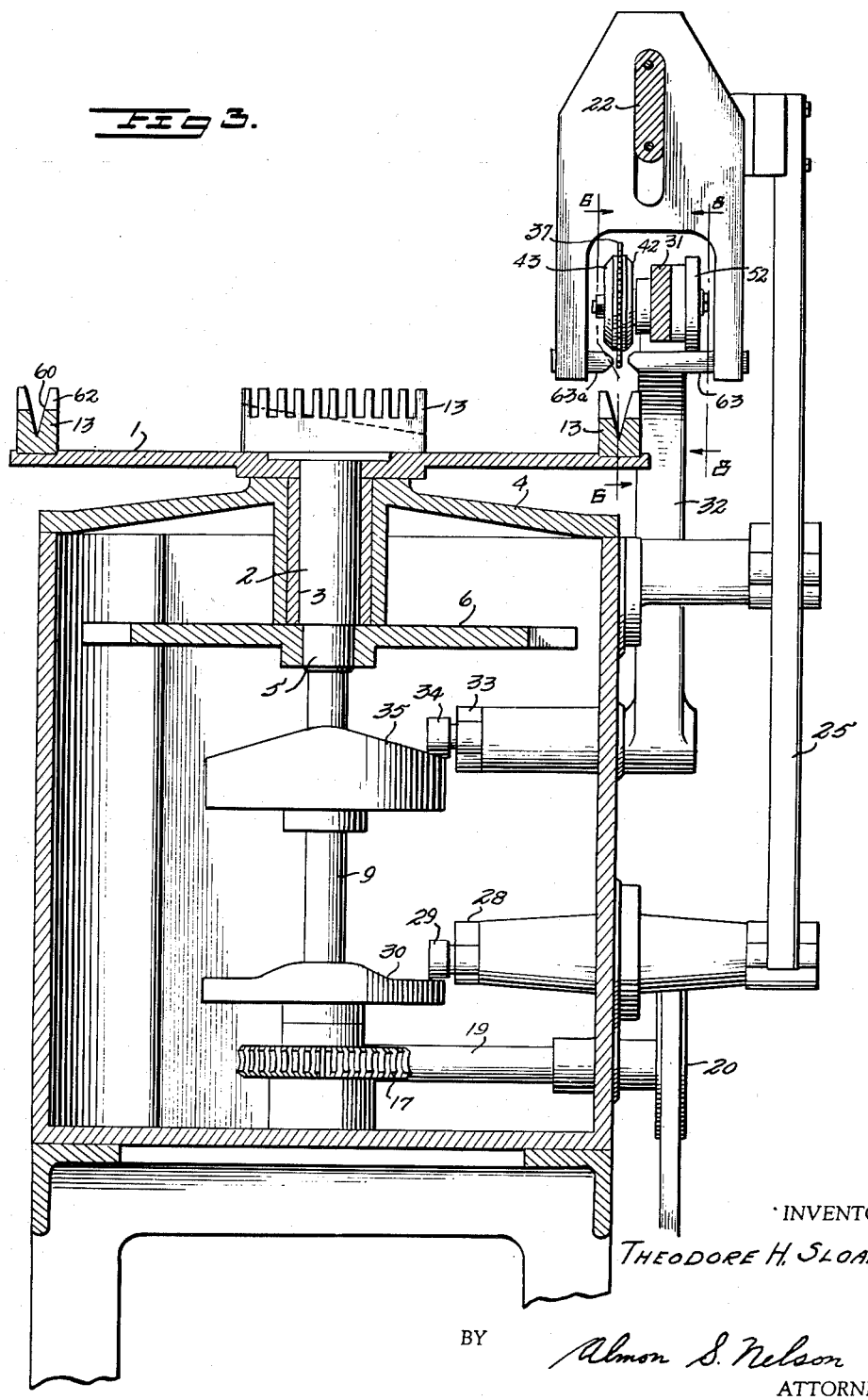
INVENTOR
THEODORE H. SLOAN,
BY Almon S. Nelson
ATTORNEY July 10, 1956  T. H. SLOAN  2,753,589
APPARATUS FOR EVISCERATING SHRIMP
Filed April 27, 1953  7 Sheets-Sheet 4

INVENTOR
THEODORE H. SLOAN,
BY
ATTORNEY

July 10, 1956     T. H. SLOAN     2,753,589
APPARATUS FOR EVISCERATING SHRIMP
Filed April 27, 1953     7 Sheets-Sheet 5
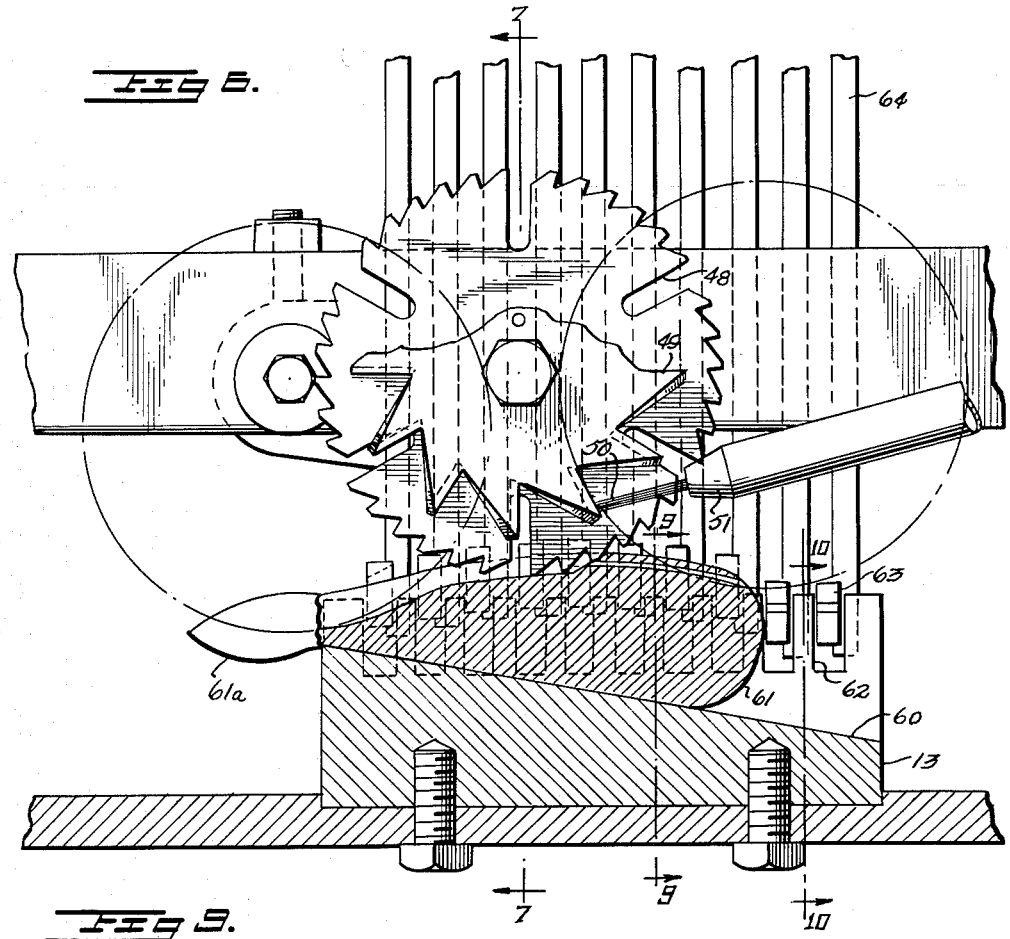
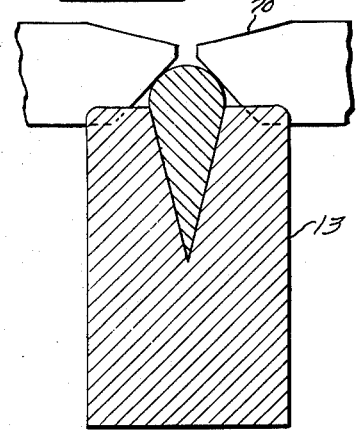
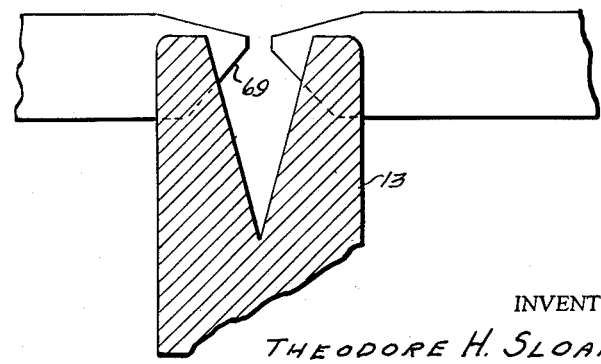
INVENTOR
THEODORE H. SLOAN,
BY
ATTORNEY

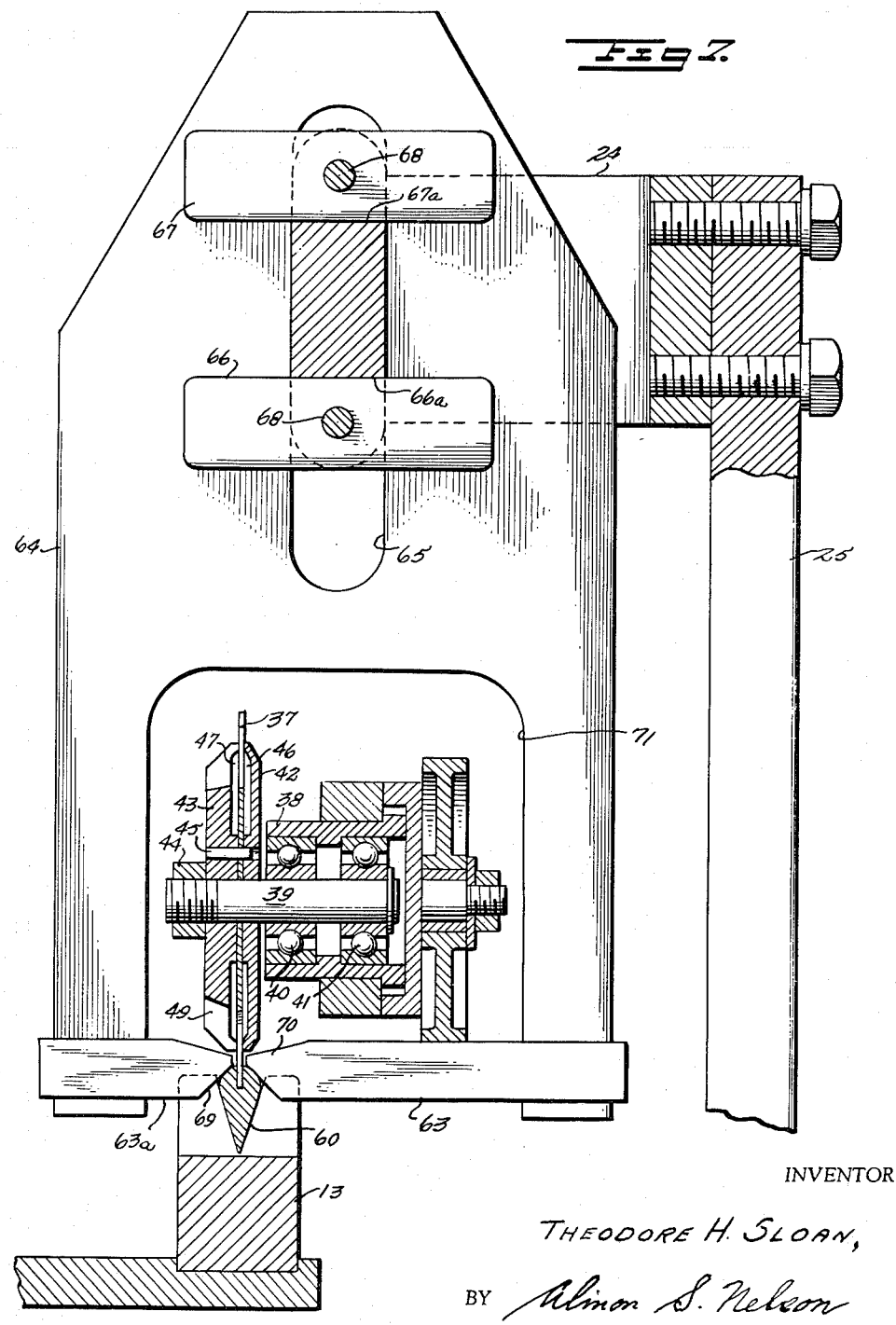

July 10, 1956  T. H. SLOAN  2,753,589
APPARATUS FOR EVISCERATING SHRIMP
Filed April 27, 1953

INVENTOR
THEODORE H. SLOAN,
BY Elmon S. Nelson
ATTORNEY

United States Patent Office 2,753,589
Patented July 10, 1956

2,753,589

APPARATUS FOR EVISCERATING SHRIMP

Theodore H. Sloan, Charleroi, Pa.

Application April 27, 1953, Serial No. 351,391

10 Claims. (Cl. 17—2)

This invention relates to new and useful improvements in apparatus and method of eviscerating shrimp.

Because of the large increase in consumer demand and the current method of packaging and freezing shrimp bodies, various means for deveining or eviscerating shrimp have been proposed and some are presently in operation which hold the shrimp while it passes underneath a cutting saw, and attempt to brush or wash out the vein after the shrimp is slit.

The difficulty with the prior art devices is that they fail to chuck the shrimp bodies in a manner to position or center the vein of the shrimp in proper relation to the saw so that the cutting of the vein is a haphazard operation. Because of the varying sizes of the shrimp bodies, which range from eight or ten to the pound to thirty-five and more to the pound, it is difficult to chuck them with the same chucking equipment and more difficult to adjust the saw cut to the contour of the shrimp bodies.

While labor in handling shrimp in deveining operations is not critical as to cost of producing deveined shrimp in the region where they are found and packaged, the loss of the shrimp meat is of utmost importance because of the cost of raw shrimp. Consequently if there is any appreciable loss in shrimp meat handled by deveining equipment as the result of improper chucking or tearing of the shrimp or because of improper or incomplete deveining, the selling price of shrimp, which is relatively high in the raw shrimp market, would be enhanced to a point where the sale of deveined shrimp is unprofitable or prohibitive.

In accordance with the present invention, apparatus for and a method of deveining shrimp are provided which eliminates waste of shrimp meat due to faulty deveining operations, and assures that shrimp, regardless of size or firmness of meat are completely deveined and cleaned.

It is among the objects of the invention to provide a method of deveining shrimp by which the shrimp is placed in a chuck assembly that automatically centers the vein of the shrimp with the path of the cutting saw, and which guides the saw over the body of the shrimp in conformity with the contour of the back of the shrimp to devein the shrimp with a cut of uniform depth and minimum cross section and to simultaneously flush out the vein as it is being cut or exposed.

It is a further object of the invention to provide apparatus for deveining shrimp employing a chuck assembly of a plurality of independently movable gripping elements or fingers to distribute the gripping or clamping pressure uniformly over the shrimp body, thereby preventing distortion thereof.

It is still a further object of the invention to provide a shrimp chucking assembly in which the relative position of the gripping or chucking elements control the depth of the saw cut.

It is a further object of this invention to provide a novel slitting and flushing assembly consisting of a turbo saw operating at high speeds by a pressure water jet, which eliminates the use of gears and belts and which is adapted to utilize the saw propulsion jet as the flushing medium which is delivered from the water turbine to the saw cut.

It is still a further object of the invention to provide a machine assembly consisting of a rotating table for supporting a portion of the shrimp chucking device, that is angularly spaced on the table, a Geneva drive for rotating the table in increments to deliver the chucked shrimp body to the saw cutting station where the shrimp is slit and cleaned during the dwell period of the Geneva drive, which assembly includes the saw carrying arm and the movable portion of the chucking mechanism that are actuated in timed relation with the movements of the table.

These and other objects of the invention will become more apparent from a consideration of the accompanying drawings, constituting a part hereof, in which like reference characters designate like parts, and in which—

Figure 1 is a rear elevational view of a shrimp deveining machine partially cut away, showing the rotary table, the chucking elements and the saw arm;

Figure 2 is a top plan view with a portion of the table cut away to show the Geneva drive:

Figure 3 is a vertical section partially in elevation taken along the line 3—3 of Figure 2;

Figure 5 is a vertical section partially in elevation of a portion of the machine drive taken along the line 5—5 of Figure 4;

Figure 6 is a side elevational view partially in section of a portion of the cutting saw and chuck assembly taken along the line 6—6 of Figure 3;

Figure 7 is an end elevational view partially in section of the chuck assembly and cutting device taken along the line 7—7 of Figure 6;

Figure 9 is a cross-section partially in elevation of a portion of the chuck assembly engaging a shrimp body taken along the line 9—9 of Figure 6;

Figure 10 is a similar view taken along the line 10—10 of Figure 6; and

Figure 4:
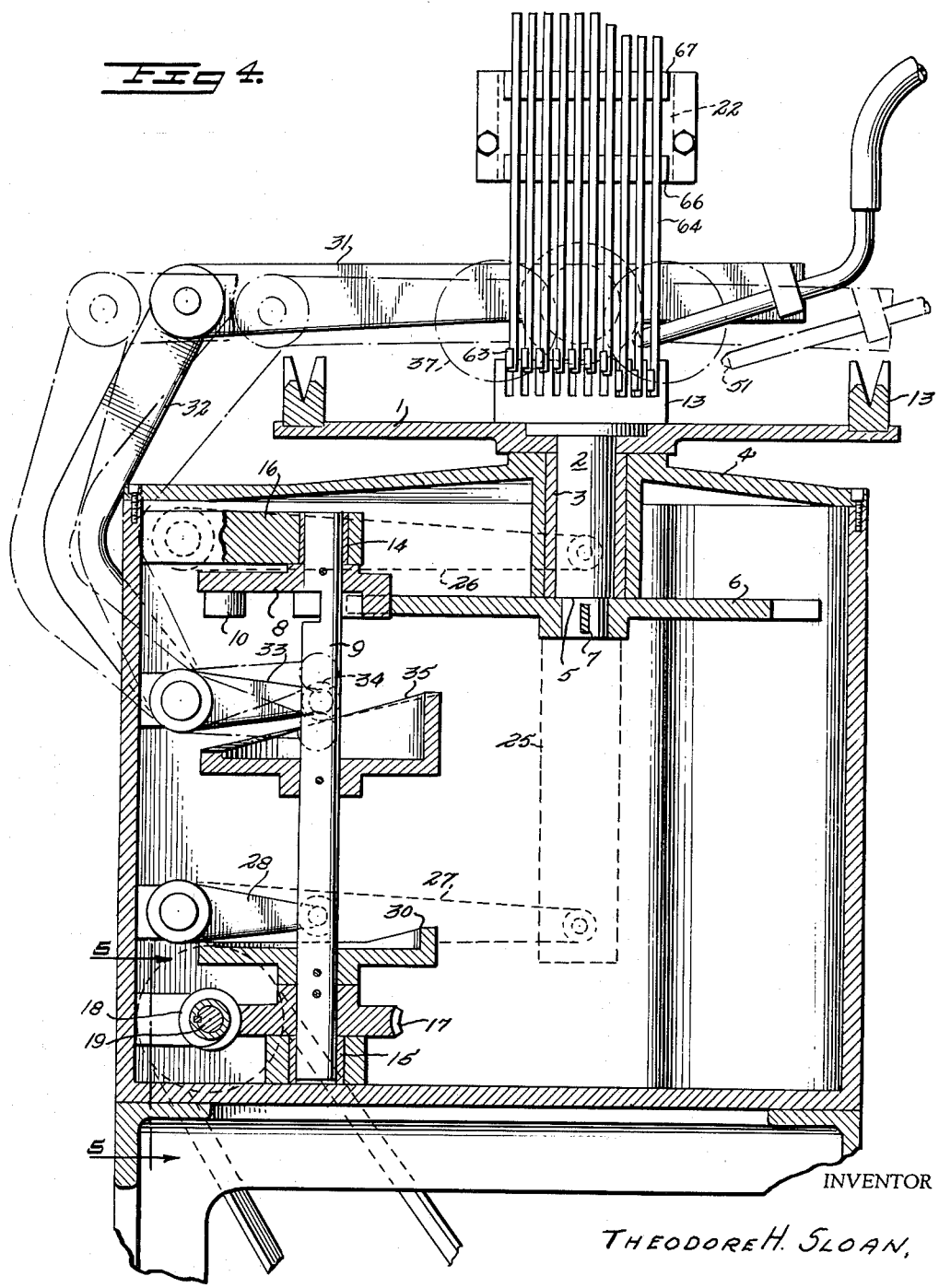
Figure 4 is a vertical section partially in elevation taken along the line 4—4 of Figure 2.

With reference to Figures 1 to 4 inclusive of the drawings, numeral 1 designates a table having mounted thereon a spindle 2 that is journaled in a bearing 3 of a cover plate 4. The end of spindle 2 is provided with a shoulder 5 for receiving a Geneva wheel 6 that is keyed to spindle 2 at 7. A Geneva drive plate 8, which carries a Geneva roller 10, Figure 4 is mounted on the main drive and cam shaft 9. The Geneva drive plate 8 is provided with a roller lock 11, Figure 2, that engages cylindrical faces 11a of the Geneva wheel 6 to hold it firmly against rotation during the dwell period of the drive. The Geneva roller 10 engages slots 12 of the Geneva wheel 6 to index the wheel as the Geneva drive plate 8 revolves with the drive shaft 9. Mounted on the rotary table 1 are a plurality of slotted chucking elements 13 angularly spaced, there being eight shown in the view of Figure 2, which will be hereinafter described in greater detail.

With reference to Figure 4 of the drawings, the main drive and cam shaft 9 is journaled in bearings 14 and 15, the bearing 14 being mounted in a bracket 16. Shaft 9 is driven by a worm gear 17 which is engaged by a drive worm 18 mounted on shaft 19 which, as shown in Figure 5, is provided with a sheave wheel 20 for a belt drive, although it may be directly connected to a gear reduction or a motor.

As shown in Figures 2, 3 and 7 the upper chuck as-

«End of page» sembly consists of a guide beam 22 secured by screws 23 to a bracket 24 that is mounted on a connecting rod 25 having pivotal connections with an upper and lower radius arm 26 and 27, respectively, Figure 1. The connecting rod 25 is raised and lowered by a cam lever 28, Figure 4, having a follower 29 that rides on cam 30 rotating with the drive and cam shaft 9.

A saw arm 31 Figures 1 and 4 is mounted on a lever 32 connected to a cam lever 33 having a follower 34 that engages cam 35. The lever 32 is operated by a coil spring 36 in its forward stroke, which is the cutting stroke of the saw 37 shown in dotted lines in Figure 4 and which is shown in end elevation in Figure 3 of the drawings. As the cam 35 revolves, cam lever 33 will operate lever 32 to retract the saw arm 31, and as the roller 34 engages the inclined face of the cam, spring 36 will move saw arm 31 from right to left as viewed in Figure 1, which is the cutting stroke.

The construction of the saw is more clearly shown in Figures 3, 6 and 7 of the drawings, and consists of a sleeve 38 that is secured to the saw arm 31 in which is journaled a saw mandrel 39 journaled in ball bearings 40 and 41. A flange plate 42 supports the saw on one side and a turbo rotor 43 on the other side, the turbo rotor being secured by a nut 44 on a threaded portion of the mandrel 39. A drive pin 45 extends through the saw, flange plate and turbo rotor, 37, 42 and 43 respectively. The flange plate 42 is grooved or recessed to provide a water chamber 46 and the turbo rotor is similarly grooved or recessed to provide a water chamber 47. The saw 37, as shown in Figures 6 and 8, is provided with slots 48 that extend into the water chambers or cavities 46 and 47, and the turbo rotor is provided with turbine blades 49 having faces inclined towards the saw as shown in dotted lines in Figure 6 to force a portion of the water jet 50 supplied by nozzle 51 into the cavities 46 and 47 from whence it is discharged through the slots 48 by both pressure and contrifugal force into the vein of the shrimp while the saw is cutting.

Figure 8:
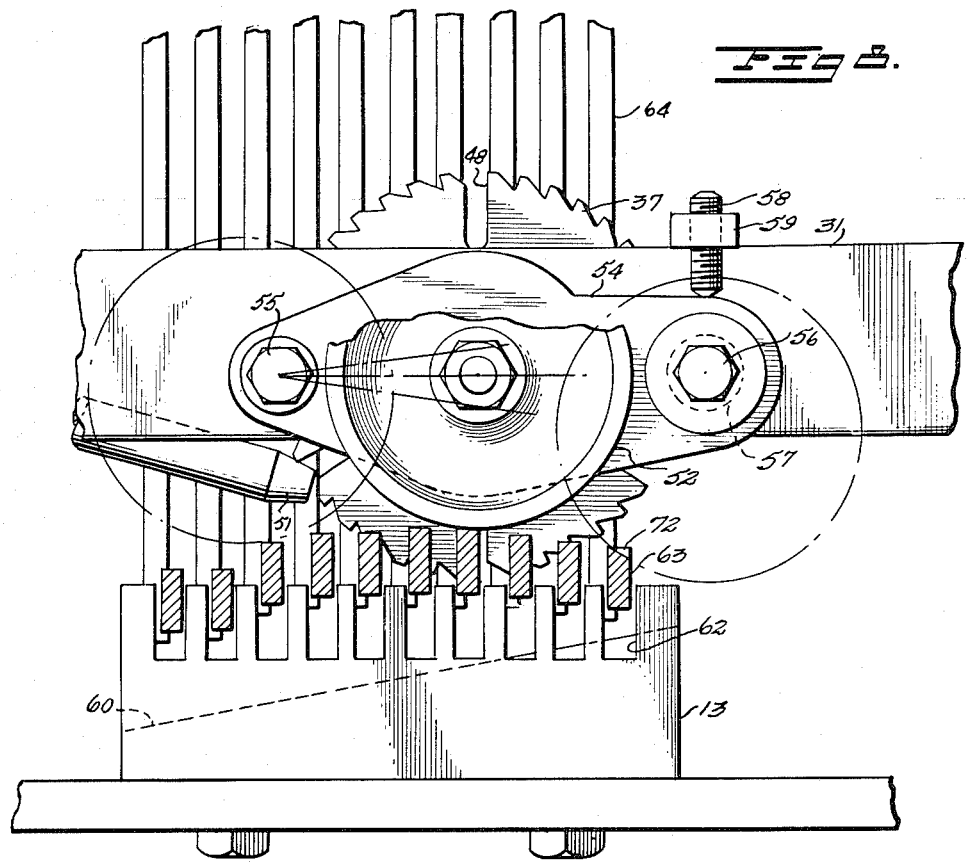
Figure 8 is a side elevational view partially in section of a portion of the chuck assembly and cutting mechanism taken along the line 8—8 of Figure 3.
Figure 11:
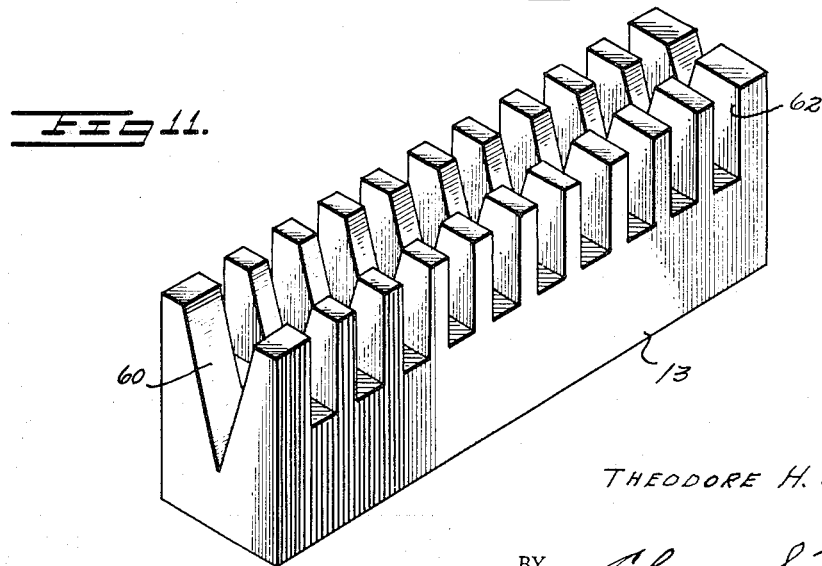
Figure 11 is an isometric view of the lower chuck member.

The slitting and flushing unit of Figures 6, 7 and 8 is provided with a cam roller 52 to control the depth of cut in a manner to be hereinafter explained. The cam roller is mounted on a stud shaft 53 carried by an adjustable bracket 54 which is secured to the saw arm 31 by bolts 55 and 56, Figure 8. The bolt 56 has a clearance as indicated by the dotted line 57 to permit adjustment of bracket 54 around the pivot bolt 55 by means of a set screw 58 mounted on a bracket 59 secured to the saw arm 31.

A primary feature of the invention is the bottom chuck and upper chuck assembly which is more clearly shown in Figures 6, 7, 8 and 11 of the drawings. It consists of the lower chuck member designated by the numeral 13, which may be termed an anvil having an inclined V-groove 60, Figure 6, for receiving the belly portion of the shrimp with the reduced or tail portion 61a in the shallow end of the V-slot 60. The anvil 13 is provided with a series of transverse slots 62, there being ten slots shown in Figure 8 for receiving gage fingers 63 and 63a which are secured to slide plates 64 of the upper chuck assembly. These slide plates are provided with elongated slots 65, Figure 7, that engage the guide beam 22. The slide plates 64 are spaced on the beam 22 by spacers 66 and 67 that are disposed in slots 66a and 67a of beam 22 and secured by pins 68. These spacers are of a sufficient area to maintain proper alignment of the slide plates 64 which are normally suspended in a lowered position as shown in Figure 7.

With reference to Figure 7 of the drawings, it will be seen that each slide plate 64 carries a long and a short gage finger 63 and 63a. These are chamfered at 69 to center the shrimp body as shown in Figures 7 and 9 of the drawings to line up or center the vein of the shrimp with the path of the saw cut. The upper faces of the gage fingers are cut away as shown at 70 to provide suitable clearance for the turbo slitting saw as shown in Figure 7. When the upper chuck assembly is lowered on the bottom chuck anvils by movement of the connecting rod 25, the gage fingers 63 and 63a come to rest on the shrimp body as in Figures 7 and 9. Because of the longitudinal curvature of the shrimp body, the slides 64 will come to rest at different lowered positions in the manner shown in Figures 6 and 8 of the drawings. Where the shrimp body terminates after their assembly in the last two slots of Figure 6, the slide plates 64 will be lowered the entire distance since there is no interference with the gage fingers 63 entering slot 62 of the anvil portion 13 of the chuck assembly. It is evident that only the weight of the slide plate 64 and gage fingers exert a gripping pressure on the shrimp body so no matter how firm or soft the shrimp meat may be there will be no tendency to distort the flesh or shape of the shrimp.

With reference to Figure 7 of the drawings, it will be noted that the cam roller 52 rests upon the gage fingers 63 and continues to do so while the saw traverses through the U-shaped openings 71 of the slide plates 64. The saw thereby follows the path established by the different height of the gage fingers 63 in the manner shown in Figures 6 and 8 of the drawings, and because the gage fingers 63 and 63a follow the contour of the shrimp, the slit or saw cut will be of uniform depth throughout the length of the cut with the following exception.

Because the alimentary canal or vein of the shrimp takes a downward curve and leaves the body almost on the center line at the tail of the shrimp, the first gage finger 63 that engages the tail end of the shrimp is notched as shown at 72, Figure 8, which permits the saw to make a deep cut, Figure 6, at this position to reach down and follow the downward curving vein to assure that the vein is opened and the contents removed.

With reference to Figure 8 of the drawings, the depth of cut may be adjusted by the set screw 58 which raises or lowers the cam roller 52 relative to the saw mandrel 39, Figure 7. Such adjustments are necessary only when the shrimp to be deveined vary in size by count to the pound as, for example, a deeper cut is employed on shrimp running up to twelve to the pound than will be employed on a small shrimp running as high as forty or more to the pound. No adjustments, however, are necessary during the run of the machine because the cam roller 52 determines the depth of the slitting cut.

The adjustment of the cam roller is illustrated in Figures 6 and 8 with reference to the center of the cam 52 and center of the saw 37 so marked in the figures of the drawings, the adjustment taking place as shown by dot and dash lines Figure 8.

The operation of the machine is briefly as follows. The shrimp is laid in the lower chuck anvils on the lower center chuck as viewed in Figure 6 and the table 1 indexes to the left as shown by the arrow, Figure 2, in response to the movement of the Geneva wheel and drive 6 and 8, respectively. As the chuck arrives at the cutting station below the upper chuck assembly, the connecting rod 25 lowers in response to action of cam 30 and the gage fingers 63 and 63a engage the shrimp, the slots 62 permitting the fingers to clear the anvil portion of the chuck in the manner more clearly shown in Figures 4, 6 and 8 of the drawings and rest upon the shrimp body. In this position the gage fingers 63 and 63a of each plate 64 are at different heights in accordance with the contour of the shrimp body which they engage and when the upper chuck assembly has been lowered the saw arm 31 traverses across from left to right as viewed in Figure 6 in response to movement of lever 32, which is actuated by the spring 36. The tail of the shrimp is always located at the shallow end of the V-groove 60 of chuck 13 and it will be noted in Figure 6 that the cut is from the tail to the head end of the shrimp, which is the opposite of most conventional practices, and which assures that the cuttings from the slitting saw will be flushed out clean from beneath the shells. As previously explained, because of the notch 72, Figure 8, in the first gage finger 63, the saw dips down to a deep cut at the beginning and then is lifted by the cam rolls 52 to follow the surface of the adjacent and successive gage fingers 63 until the cut has been completed, the cutting action being clearly shown in Figure 6 of the drawings.

Upon completion of the cut, the chuck assembly is raised by cam lever 28 which automatically raises the saw clear of the shrimp body, then the saw arm 31 is retracted to its starting position. While the saw is retracting the machine indexes to the next position, the chuck anvil lines up with a discharge finger 73, Figures 1 and 2, which is mounted on an arm 74 secured by a rod 75 extending from the machine frame. Upon the following indexing movement of the table, the finger 73 will move the shrimp from the anvil portion of the chucking device and it will drop on a conveyor belt or other receiving means.

By means of the above-described apparatus, the shrimp is properly centered for receiving the saw cut with the vein in the cutting path of the saw. Because of this accurate chucking of the shrimp, a relatively thin saw blade may be employed, which reduces the loss of meat. Because of the waste water of the turbo jet having some pressure when it enters the saw slots 48 from which both by pressure and centrifugal force it enters the saw cut at the time the saw is cutting into the vein and has loosened its contents, the cuttings and dirt, which usually is very difficult to dislodge will be cleaned out without the need of a wastefully wide and deep cut. Because of the turbo jet drive of the saw, it can be operated at very high speeds, such as 3000 R. P. M. or more to provide a smooth and clean cutting action.

The rate at which shrimp may be deveined is limited only by the capacity of the operator to insert the shrimp in the chucking anvils.

Although one embodiment of the invention has been herein illustrated and described, it will be evident to those skilled in the art that various modifications may be made in the details of construction without departing from the principles herein set forth.

I claim:

1. In a shrimp eviscerating machine, a rotary table, a Geneva wheel attached to the table, and a Geneva drive for rotating the wheel in increments of angular movement, a plurality of chuck members mounted on said table in angularly spaced relation, the spacing corresponding to the indexing movement of the rotary table, a movable chucking assembly mounted for vertical movement in cooperative alignment with the chuck elements of the rotary table, the vertical movement of which is timed in relation to the indexing movement of the table, said upper chuck assembly having a passage for a movable saw arm, and a cutting saw mounted on an arm adapted for movement through the upper chucking assembly passage when it is in its lowered position in engagement with the shrimp in the table chuck members, and a combined drive and cam shaft for coordinating the movements of the rotary table upper chucking assembly and cutting saw in timed relation to one another.

2. In a shrimp eviscerating machine, apparatus for chucking the shrimp consisting of a lower chuck member having an inclined slot for receiving the bottom of the shrimp and an upper chuck assembly adapted to be raised and lowered toward said lower chuck, the lower chuck having a plurality of transverse slots extending a substantial depth, and the chuck assembly having a plurality of gage fingers in alignment with and adapted to be lowered into the slots of the bottom chuck member, said gage fingers being suspended from the chuck assembly to adapt them to rest on the upper body of the shrimp and to conform to the contour of the shrimp body and when so resting clear the bottom chuck member.

3. In a shrimp eviscerating machine, a chuck for holding the shrimp consisting of a bottom chuck member and an upper chuck assembly, the bottom chuck member having an inclined slot shaped to hold the shrimp body against tilting when laid therein, and having transverse slots merging with said inclined slot, said upper chuck assembly comprising a guide beam, a plurality of plates mounted for sliding movement in a vertical direction on said guide beam, each of said plates having cut-out portions in alignment to form a passage for a saw arm and having gage fingers in alignment with the transverse slots of the bottom chuck member to clear said slots, a saw arm mounted for movement through the cut-out portions of said plates, a circular saw mounted on said arm the cutting blade of which is centered with the inclined slot of the bottom chucking member, said arm having guide means for engaging and for resting on said gage fingers to determine the depth of cut of the saw and means connected to the guide beam for subjecting the latter to vertical movement to lower the gage fingers on the body of the shrimp in the lower chuck member during the cutting stroke of the saw and to lift the gage fingers and the cutting saw when the cut is completed.

4. In a shrimp eviscerating machine, a chuck for holding the shrimp consisting of a bottom chuck member and an upper chuck assembly, the bottom chuck member having an inclined slot shaped to hold the shrimp body against tilting when laid therein, and having transverse slots merging with said inclined slot, said upper chuck assembly comprising a guide beam, a plurality of plates mounted for sliding movement in a vertical direction on said guide beam, each of said plates having cut-out portions in alignment to form a passage for a saw arm and having gage fingers in alignment with the transverse slots of the bottom chuck member to clear said slots, a saw arm mounted for movement through the cut-out portions of said plates, a circular saw mounted on said arm the cutting blade of which is centered with the inclined slot of the bottom chucking member, said arm having guide means for engaging and for resting on said gage fingers to determine the depth of cut of the saw and means connected to the slide guide beam for subjecting the latter to vertical movement to lower the gage fingers on the body of the shrimp in the lower chuck member during the cutting stroke of the saw and to lift the gage fingers and the saw when the cut is completed, the gage fingers carried by the slide plates terminating to form a cutting space for the saw on the center line of the lower chucking element.

5. In a shrimp eviscerating machine, a chuck for holding the shrimp consisting of a bottom chuck member and an upper chuck assembly, the bottom chuck member having an inclined slot shaped to hold the shrimp body against tilting when laid therein, and having transverse slots merging with said inclined slot, said upper chuck assembly comprising a guide beam, a plurality of plates mounted for sliding movement in a vertical direction on said guide beam, each of said plates having cut-out portions in alignment to form a passage for a saw arm and having gage fingers in alignment with the transverse slots of the bottom chuck member to clear said slots, a saw arm mounted for movement through the cut-out portions of said plates, a circular saw mounted on said arm the cutting blade of which is centered with the inclined slot of the bottom chucking member, said arm having guide means for engaging and for resting on said gage fingers to determine the depth of cut of the saw and means connected to the slide guide beam for subjecting the latter to vertical movement to lower the gage fingers on the body of the shrimp in the lower chuck member during the cutting stroke of the saw and to lift the gage fingers and the saw when the cut is completed, the gage fingers carried by the slide plates terminating to form a cutting space for the saw on the center line of the lower chucking element, the ends of the gage fingers having chamfered faces for centering the shrimp with the inclined slot of the chuck when resting upon the top of the shrimp body.

6. In a shrimp eviscerating machine, a shrimp chucking unit consisting of a bottom chuck having an inclined slot for receiving a shrimp body, an upper chuck assembly consisting of a beam having a plurality of slide plates mounted for sliding movement in a vertical direction, said bottom chuck having parallel slots merging with said inclined slot disposed transversely to the axis of the inclined slot and said slide plates having fingers in alignment with said transverse slots terminating adjacent the center line of the inclined slot of the bottom chucking member, said fingers being shaped to rest upon and center the body of the shrimp at points varying with the contour of the shrimp body, the slide plates supporting the fingers having cut out portions for accommodating the slitting and flushing unit which consists of a saw arm mounted for movement through the cut-out portions of the side plates, a saw mounted on said arm in alignment with the spacing between the fingers to center the same with the center of the shrimp body and said saw arm being provided with a guide roller for riding on the gage fingers to control the depth of the saw cut in accordance with the location of the gage fingers resting upon the shrimp body.

7. In a shrimp eviscerating machine, a shrimp chucking unit consisting of a bottom chuck having an inclined slot for receiving a shrimp body, an upper chuck assembly consisting of a beam having a plurality of slide plates mounted for sliding movement in a vertical direction, said bottom chucking member having parallel slots merging with and disposed transversely to the axis of the inclined slot and said slide plates having fingers in alignment with said transverse slots terminating adjacent the center line of the inclined slot of the bottom chucking member, said fingers being shaped to rest upon the body of the shrimp at points varying with the contour of the shrimp body to center the vein with the path of the saw, the slide plates supporting the fingers having cut out portions forming a space for accommodating the slitting and flushing unit which consists of a saw arm having a saw mounted in alignment with the spacing between the fingers to center the same with the center of the shrimp body and said slitting unit being provided with a cam roller which is adapted to rest upon the gage fingers to control the depth of the saw cut in accordance with the location of the gage fingers resting upon the shrimp body, said saw being mounted for movement through the cut-out portions of the slide plates to traverse the shrimp body to slit the same and said slide plate guide beam being mounted for vertical reciprocal movement in timed relation with the movement of the saw.

8. In a shrimp eviscerating machine, a shrimp chucking unit consisting of a bottom chuck having an inclined slot for receiving a shrimp body, an upper chuck assembly consisting of a beam having a plurality of slide plates mounted for sliding movement in a vertical direction, said bottom chucking member having parallel slots merging with and disposed transversely to the axis of the inclined slot and said slide plates having fingers in alignment with said transverse slots terminating adjacent the center line of the inclined slot of the bottom chucking member, said fingers being shaped to rest upon and center the body of the shrimp with the inclined slot at points varying with the contour of the shrimp body, the slide plates supporting the fingers having cut out portions for accommodating the slitting and flushing unit which consists of a saw arm having a saw mounted in alignment with the spacing between the fingers to center the same with the center of the shrimp body, said saw being mounted for movement through the cut-out portions of the slide plates and said slitting unit being provided with a cam roller which is adapted to rest upon the gage fingers to control the depth of the saw cut in accordance with the location of the gage fingers resting upon the shrimp body, said cam roller being adjustable relative to the saw to regulate the depth of the saw cut.

9. In a shrimp eviscerating machine the combination with a shrimp chucking unit consisting of a support for receiving the shrimp and a plurality of juxtaposed fingers resting upon and centering the shrimp in said support, of a slitting member comprising a cutting disc, an arm operatively associated with said cutting disc and a cam roller mounted on said arm for movement longitudinally of the shrimp body between the ends of said fingers, said cam roller being supported by said fingers during the slitting movement of the cutting disc to control the depth of cut in conformity with the position of the fingers relative to the shrimp body.

10. In a shrimp eviscerating machine the combination with a shrimp chucking unit consisting of a support for receiving the shrimp and a plurality of juxtaposed fingers resting upon and centering the shrimp in said support, of a slitting member comprising a cutting disc, an arm operatively associated with said cutting disc and a cam roller mounted on said arm for movement longitudinally of the shrimp body between the ends of said fingers, said cam roller being supported by said fingers during the slitting movement of the cutting disc to control the depth of cut in conformity with the position of the fingers relative to the shrimp body, and one or more of said fingers being shaped to vary the depth of cut.

References Cited in the file of this patent

UNITED STATES PATENTS

| | | |
|---|---|---|
| 824,347 | Fletcher | June 26, 1906 |
| 1,140,952 | Christensen | May 25, 1915 |
| 1,402,982 | Webb et al. | Jan. 10, 1922 |
| 2,263,694 | Grayson | Nov. 25, 1941 |
| 2,534,767 | Greiner et al. | Dec. 19, 1950 |
| 2,625,705 | Avetta et al. | Jan. 20, 1953 |
| 2,626,701 | Avetta et al. | Jan. 27, 1953 |

FOREIGN PATENTS

| | | |
|---|---|---|
| 562,476 | Great Britain | July 4, 1944 |